United States Patent Office 3,555,924
Patented Jan. 19, 1971

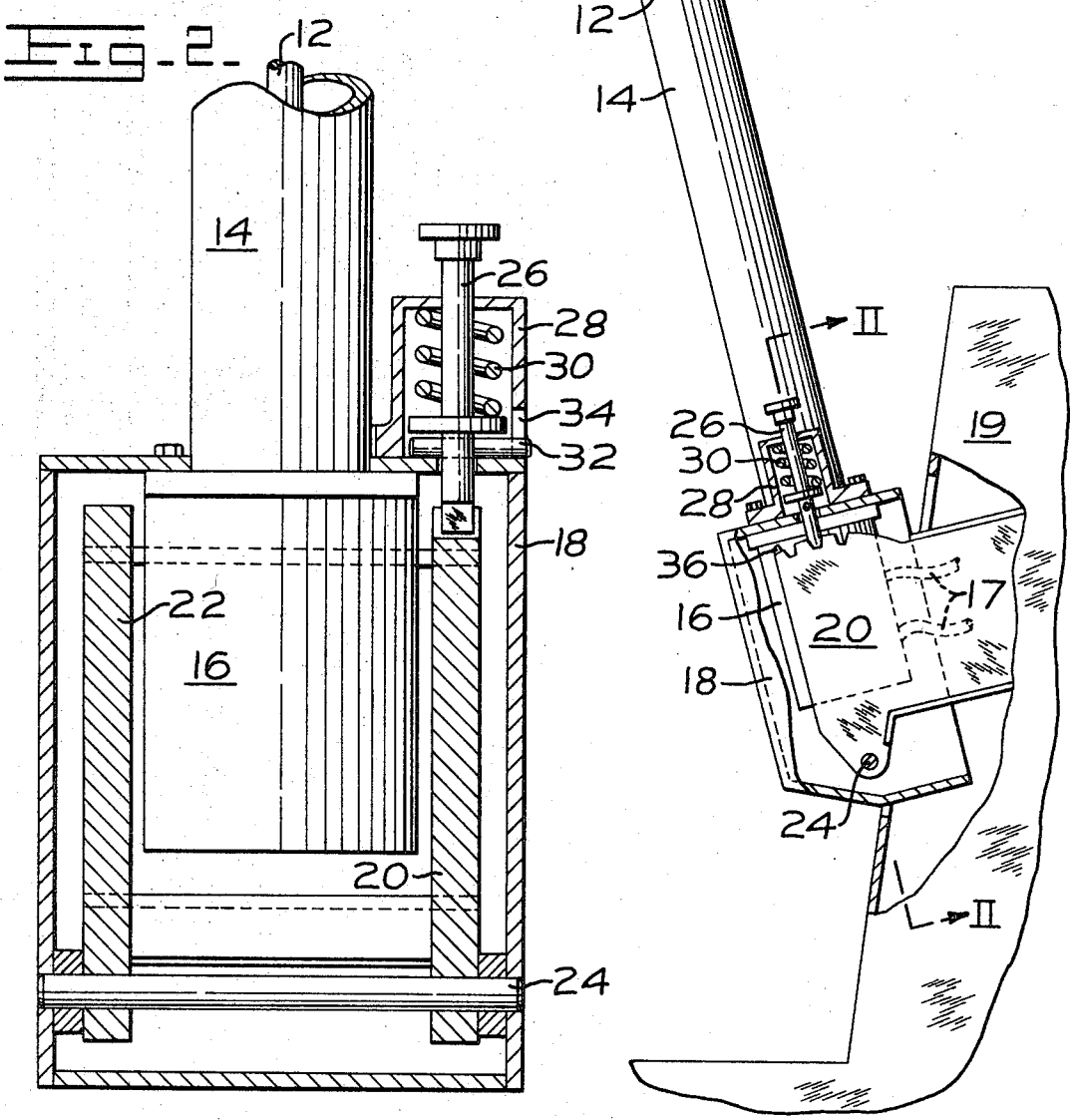

3,555,924
ADJUSTABLE STEERING WHEEL
Oscar A. Scheffler, Jr., Wheaton, Ill., assignor to Caterpillar Tractor Co., Peoria, Ill.
Filed Nov. 25, 1968, Ser. No. 778,608
Int. Cl. B62d 1/18
U.S. Cl. 74—493    1 Claim

ABSTRACT OF THE DISCLOSURE

A steering wheel which is adjustable to and away from a vehicle operator's station to adapt it to the requirements of different drivers, in which a pivot point is provided below the lower end of the steering column and locking means for holding the wheel in different positions is provided at a readily accessible point.

---

The location of a steering wheel, particularly on large vehicles, is generally a compromise to suit the needs and comfort of a driver of average size. This often proves undesirable and uncomfortable for operators who are larger or smaller than average size.

The present invention provides an adjustable wheel which is pivoted to prevent forward and rearward movement of the entire steering column. This enables easy access to the driver's station when the adjustment has been made forwardly to accommodate a large man, it also avoids complex mechanisms in undesirable locations. The invention also provides a very simple and easily actuated locking device readily available to an operator as he sits in the driver's seat. A more detailed understanding of the invention will be had upon reading the following specification wherein reference is made to the accompanying drawing:

In the drawing:

FIG. 1 is a view in side elevation with parts in section and parts broken away of a vehicle steering wheel and a portion of a controls console upon which it is mounted; and FIG. 2 is an enlarged sectional view taken on the line II—II of FIG. 1.

In FIG. 1 a steering wheel 10 is shown on a steering shaft 12 which is housed in a column 14. The lower end of the steering shaft actuates a hydraulic control, not shown, contained in a housing 16. The control directs flow of fluid through conduits 17 which form a part of a hydraulic steering circuit, not shown. The lower end of the steering column 14 is secured to a housing 18 and adjacent its lower end, the housing is pivotally connected to brackets 20 and 22 as by a pivot shaft 24. These brackets are fixed to and extend outwardly from a controls console 19, and the pin 24 supports both the housing and the steering column assembly.

The bracket 20 has an arcuate notched upper edge and the notches receive the lower end of a latch pin 26 which reciprocates in a spring housing 28 secured by cap screws, as shown, to the top of the housing 18. A spring 30 urges the latch pin into any one of the notches for retaining the steering column in a desired position and the position may be changed by raising the latch pin temporarily, the pin being disposed within easy reach of the operator. A guide pin (best shown at 32 in FIG. 2) extends through the latch pin and projects through an opening 34 in the spring chamber. This serves to prevent rotation of the latch pin and also serves to limit retracting movement of the latch pin so it will necessarily engage a stop 36 (see FIG. 1) which prevents movement of the steering column rearwardly beyond a fixed limit.

What is claimed is:

1. In an adjustable steering wheel which includes a wheel disposed at the upper end of a steering column, the improvement which comprises a pivotal support for the column at a position below its lower end, said pivotal support including a pivot pin extending between spaced brackets supported by a console, a housing at the lower end of said steering column enclosing said brackets, and latching means including a latch pin carried at the lower end of said column and engageable with spaced notches in one of said brackets to latch said steering column in any one of a plurality of positions.

References Cited

UNITED STATES PATENTS

| 1,893,775 | 1/1933 | Heaslet | 74—536 |
| 840,660 | 1/1907 | Riker | 74—493X |
| 3,032,134 | 5/1962 | Banker | 74—493X |
| 3,395,930 | 8/1968 | Morgan. | |

MILTON KAUFMAN, Primary Examiner

U.S. Cl. X.R.
180—78; 280—87